United States Patent [19]

Loeffler et al.

[11] Patent Number: 4,827,793
[45] Date of Patent: May 9, 1989

[54] FORWARD/CENTER CONTROL SHIFTING APPARATUS FOR A VEHICLE TRANSMISSION

[75] Inventors: John M. Loeffler, Toledo, Ohio; Rick D. Watson, Lambertville, Mich.

[73] Assignee: Dana Corporation, Toledo, Ohio

[21] Appl. No.: 200,960

[22] Filed: Jun. 1, 1988

[51] Int. Cl.⁴ .................... G05G 9/14; G05G 5/10
[52] U.S. Cl. ............................... 74/477; 403/4; 180/336; 29/469; 74/473 R
[58] Field of Search .................. 403/4; 180/336; 74/473 R, 477; 29/469

[56] References Cited

U.S. PATENT DOCUMENTS 2,344,096  3/1944  Kümmich .................. 74/473 R
4,543,846  11/1985  Inui et al. .................. 74/477

FOREIGN PATENT DOCUMENTS 2130664  6/1984  United Kingdom .......... 74/473 R

Primary Examiner—Allan D. Herrmann
Assistant Examiner—Janice E. Chartoff
Attorney, Agent, or Firm—Marshall & Melhorn

[57] ABSTRACT

A shift tower housing and the outer housing of a vehicle transmission are both formed with a bolt pattern that permits mounting of the shift tower and associated shift lever in both a forward control position and a center control position. Each of the shift bars in the transmission is formed with a pair of notches, a forward notch and a center notch for engaging the lower end of the shift lever in the forward control and center control positions respectively. An interlock bracket is trapped and retained by a mounting plate prior to the installation of the shift tower and is adjustable between the center and the forward positions. The interlock bracket includes a pair of arms for engaging the notches in the shift bars not being engaged by the shift lever to prevent movement of the non-selected shift bars during actuation of the transmission.

15 Claims, 4 Drawing Sheets

FORWARD/CENTER CONTROL SHIFTING APPARATUS FOR A VEHICLE TRANSMISSION

BACKGROUND OF THE INVENTION

This invention relates generally to shifters for vehicle transmissions and, more particularly, is directed to a shift assembly which is interchangeable between forward and center control positions.

Typically, a truck transmission includes at least one shift bar having a longitudinal axis that extends in a generally horizontal plane parallel to the longitudinal axis of the transmission. The shift bar is controlled by a generally vertically extending shift lever and in turn controls the relationship of the gears in the transmission for shifting among a plurality of predetermined gear ratios. A shift lever housing is fastened to the top of the transmission for slidably or pivotally mounting the shift lever. A lower end of the shift lever extends through the housing and into the transmission where it is received in a notch formed in the associated shift bar.

The same model of transmission may be utilized in different truck cabs one of which may require a forward control position for the shift lever and another one of which may require a central control position for the shift lever. Heretofore, different shift tower housings, different shift bars and sometimes different shift forks had to be provided to accommodate both forward and center control positions for the same transmission. Thus, the transmission manufacturer was required to manufacture two different sets of parts for either forward or center control of the same transmission. Furthermore, both sets of parts had to maintained in the inventories of the transmission manufacturer, the truck manufacturer, and the transmission repair facilities.

SUMMARY OF THE INVENTION

These and other problems of the prior art are solved by the shift control apparatus according to the present invention. The shift tower housing includes means for pivotally mounting the shift lever. A base portion of the shift tower is extended to cover an opening in the transmission housing for the lever for both a forward mounting position and a center mounting position. A shift bar has a pair of notches formed therein, one notch at a forward control position and another notch at a center control position, for engaging the shift lever.

When it is determined whether the transmission/truck cab combination requires forward control or center control, the shift tower according to the present invention is assembled to the transmission housing in the proper orientation and the shift lever engages the corresponding one of the notches in the shift bar.

The present invention also relates to an interlock bracket for preventing actuation of more than one shift bar at a time. In a typical nine speed transmission, three shift bars are utilized to change the gear ratios. As one shift bar is being actuated by the shift lever, an interlock bracket engages the other two shift bars to prevent their movement. A mounting plate retains the bracket prior to installation of the shift lever and tower and the bracket cooperates with guide pins in the tower for lateral movement and support. The guide pins and internal ribs in the housing prevent assembly of the tower to the transmission housing unless the bracket is in the corresponding forward or center control position.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
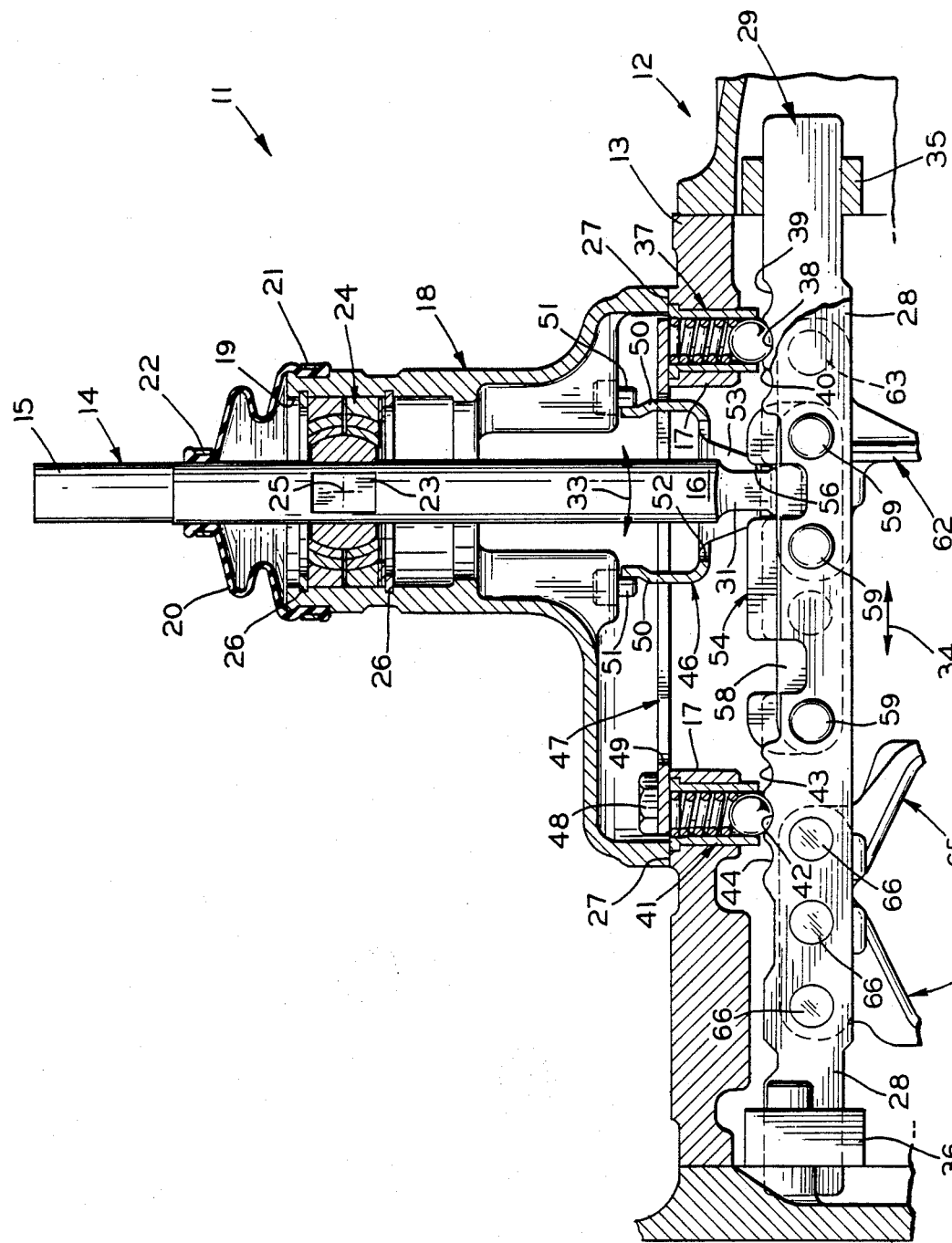
FIG. 1 is a cross-sectional, side elevational view taken perpendicular to the longitudinal axis of a vehicle transmission including a shift lever and tower assembly in accordance with the present invention in a center control position.

There is shown in FIG. 1 a shifting apparatus including a shift lever and tower assembly 11, in accordance with the present invention, mounted on a vehicle transmission 12 having an outer housing 13. The lever and tower assembly 11 includes a shift lever 14 having an upper end 15 extending upwardly and outwardly from an upper end of the assembly 11 and a lower end 16 extending through an aperture or opening 17 formed in the transmission housing 13. The lever and tower assembly 11 also includes a tower housing 18 defining an opening 19 through which the upper end 15 of the shift lever 14 extends. The opening 19 is closed by a flexible boot 20, which has a larger diameter open end surrounding and attached to the tower housing 18 by an encircling band 21. The upper end 15 of the shift lever 14 extends through a smaller diameter open end of the boot 20 which is attached to the shift lever 14 by an encircling band 22. The boot 20 is utilized to prevent dirt and liquids from entering the opening 19 and damaging the shift lever 14 and transmission components which are located below.

A central portion 23 of the shift lever 14 cooperates in a known manner with a bearing assembly 24 to prevent vertical movement of the shift lever with respect to the tower housing 18 and to permit pivotal movement of the upper end 15 and the lower end 16 of the shift lever about a pivot point 25 defined in the central portion 23. Such pivotal movement permits the shift lever 14 to be utilized to move an associated shift bar in the vehicle transmission as will be explained below. The bearing assembly 24 is retained inside the tower housing 18 between a pair of snap rings 26 which engage grooves formed in an inner wall of the tower housing.

Referring to FIGS. 1, 3, 4, 6 and 7, the shift lever tower housing 18 is mounted on a generally horizontally extending boss 27 surrounding and defining the opening 17 formed in the transmission housing 13. The opening 17 provides access to a plurality of shift bars 28, 29 and 30 which extend in a generally horizontal direction through the transmission for actuating the transmission gears. The shift bar 29 is the center one of the three shift bars. In a generally vertical orientation, the lower end 16 of the shift lever 14 terminates in a tang portion 31 which engages a forward notch 32 formed in the center shift bar 29. Thus, as the shift lever 14 is rotated in the bearing assembly 24 about the pivot point 25 in a plane parallel to the longitudinal axis of the transmission, the lower end 16 and the tang portion 31 will rotate in a forward direction and a backward direction as indicated by an arrow 33 (FIG. 1) thereby moving the shift bar 29 in the direction of its longitudinal axis in a forward direction or a rearward direction respectively as shown by an arrow 34.

Figure 4:
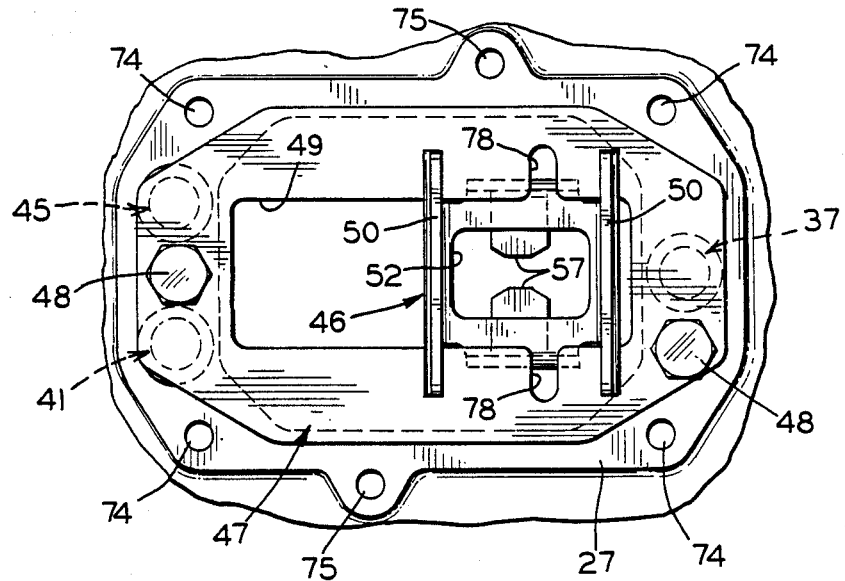
FIG. 4 top plan view similar to FIG. 3 with the shift lever and the shift tower removed to show the locating plate and the interlock bracket.
Figure 7:
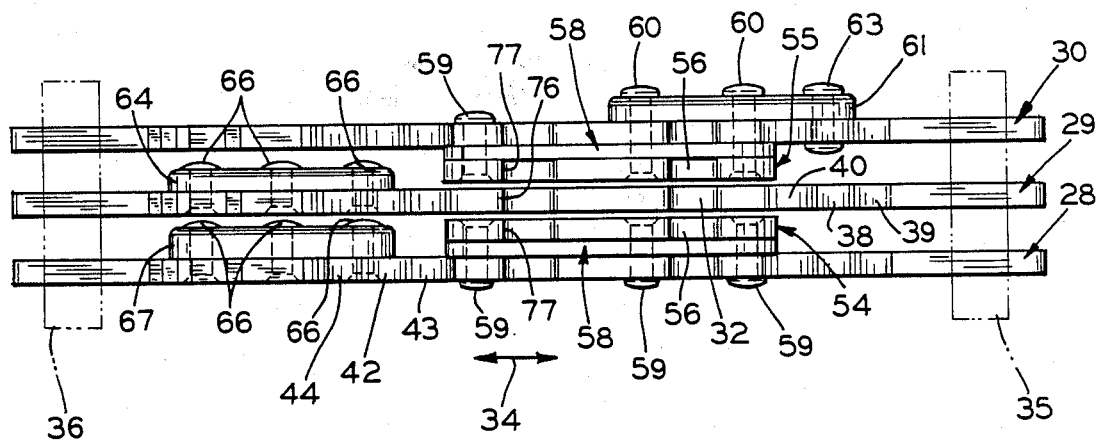
FIG. 7 is a top plan view of the shift bars shown in FIGS. 1 and 6.

The shift bars are supported for movement along their longitudinal axes by a bearing or bushing block 35 mounted in the transmission housing 13 and slidably engaging a forward end of each of the shift bars. A similar rear bearing or bushing block 36 supports the opposite ends of the shift bars. As shown in FIGS. 1 and 7, the shift bars are in the center one of three gear selection positions. A spring-loaded ball bearing detent 37 is mounted in the transmission housing 13 below the boss 27 and extends downwardly into engagement with a central depression 38 formed in the forward end of the shift bar 29. When the upper end 15 of the shift lever 14 is manually actuated to pivot the lower end 16 in a rearward direction, the shift bar 29 will move in a rearward direction and the detent 37 will engage a forward depression 39 to maintain the shift bar 29 in its rearward position. If the shift lever 14 is pivoted in a direction to move the shift bar 29 in a forward direction, the detent 37 will engage a rearward depression 40 to maintain the shift bar 29 in its forward position. Similar detents can be provided for the other shift bars in a rearward portion of the boss 27. For example, a detent 41 is provided for engaging a central depression 42, a forward depression 43 and a rearward depression 44 formed in the left shift bar 28. The locations of the detents 37 and 41 and the location of a detent 45 for the right shift bar 30 are shown in FIG. 4. The shift bars 28, 29 and 30 are substantially identical such that they are interchangeable until assembled as described below.

Figure 6:
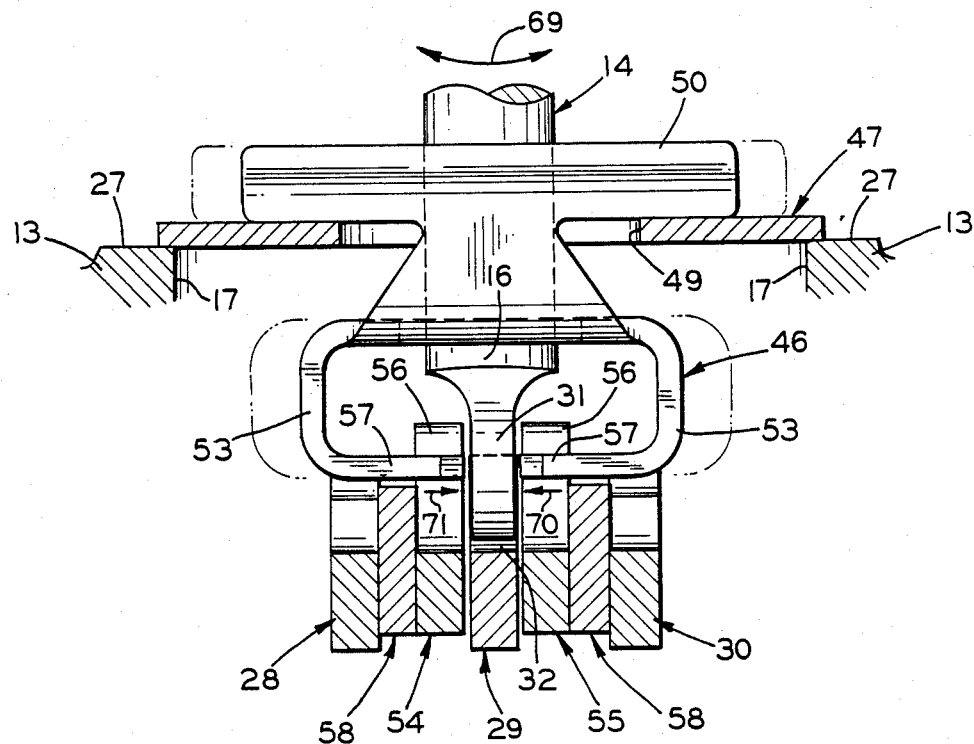
FIG. 6 is an enlarged cross-sectional, fragmentary front elevational view of the present invention as shown in FIG. 1.

The lower end 16 of the shift lever 14 extends through apertures formed in an interlock bracket 46 and a mounting plate 47. FIG. 4 is a top plan view of the interlock bracket 46 and the mounting plate 47 with the tower housing 18 and the shift lever 14 removed. The peripheral edge portion of the mounting plate 47 extends around and rests on the boss 27. The mounting plate 47 is attached to the transmission housing 13 by a pair of fasteners such as bolts 48. Formed in the central portion of the mounting plate 47 is an elongated aperture 49. Referring to FIGS. 1, 4 and 6, the shift lever 14 and the bracket 46 extend downwardly through a forward portion of the aperture 49. The bracket 46 is formed with a pair of generally parallel, spaced apart T-shaped arms 50 the upper ends of which rest on an upper surface of the mounting plate 47. The upper ends of the arms 50 are located between two pairs of guide pins 51 (only one pair is shown in FIG. 1) which extend downwardly from an interior surface of the tower housing 18.

Figure 5:
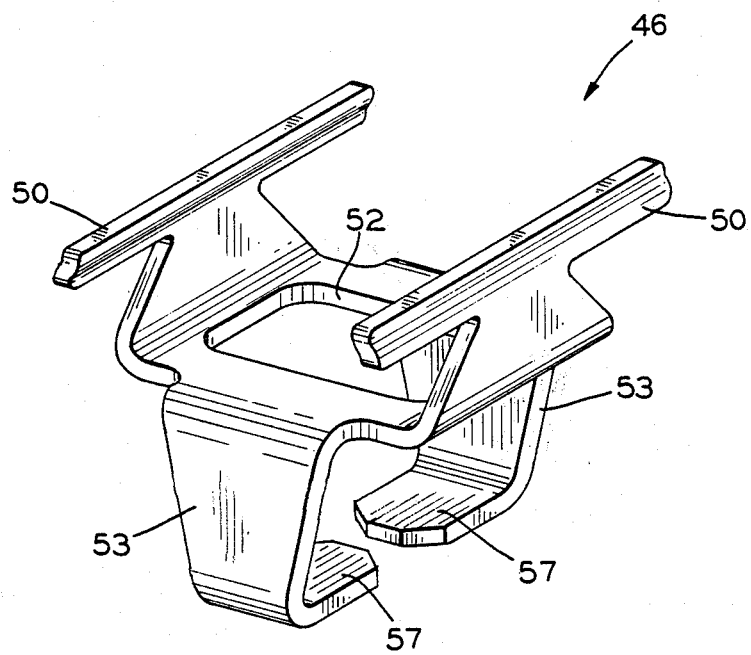
FIG. 5 is a perspective view of the interlock bracket shown in FIG. 4.

As best shown in FIG. 6, the tang portion 31 of the lower end 16 of the shift lever 14 extends downwardly into the notch 32 formed in the shift bar 29. The T-shaped arms 50 rest on the upper surface of the mounting plate 47 and extend downwardly through the elongated aperture 49. Referring to FIGS. 4 and 5, the arms 50 extend generally horizontally toward one another to form two opposing sides of an aperture 52 through which the shift lever 14 extends. The other opposed sides of the aperture 52 are formed by the upper ends of a pair C-shaped arms 53 the lower ends of which terminate adjacent opposite sides of the shift bar 29 in the area of the notch 32.

Positioned adjacent and spaced from opposite sides of the shift bar 29 are a pair of interlock connector bars 54 and 55. Each of the connector bars includes a forward notch 56 formed in an upper surface thereof aligned with the notch 32 formed in the shift bar 29. The notches 56 engage associated arms 57 formed at the lower ends of the associated ones of the C-shaped arms 53 such that the connector bars 54 and 55 are held in place by the bracket 46 as the shift bar 29 is moved in the direction of the arrow 34 by the shift lever 14. Positioned on an opposite side of each of the connector bars 54 and 55 from the shift bar 29 are a pair of stop bars 58.

As best shown FIG. 7, the connector bar 54 and one of the stop bars 58 are attached to the left shift bar 28 on a side facing the center shift bar 29 by a plurality of fasteners such as rivets 59. In a similar manner, the connector bar 55 and one of the stop bars 58 are attached to a surface of the right shift bar 30 facing the center shift bar 29 by one of the rivets 59 and a pair of longer rivets 60 which also extend through a connector portion 61 of a shift yoke 62 (FIG. 1). The connector portion 61 is fastened along an outwardly surfacing surface of the right shift bar 30 by the rivet 60 and another rivet 63. The shift yoke 62 extends downwardly into the transmission 12 for changing ratios as the right shift bar 30 is moved by the shift lever 14 as will be described below. A connector portion 64 of a shift yoke 65 is attached to the center shift bar 29 on a side thereof facing the right shift bar 30 by a plurality of rivets 66. Similarly, a connector portion 67 of a shift yoke 68 is attached to a surface of the left shift bar 28 facing the center shift bar 29 by a plurality of the rivets 66. The shift yokes 65 and 68 also extend downwardly into the transmission 12 for changing gears. The center position is always neutral. Thus, since each of the three shift bars 28, 29, and 30 has two other positions, there is a total of six gear ratios available in the vehicle transmission 12 which can be selected by movement of the shift lever 14. Other conventional means (not shown) can provide additional gear ratios.

Referring to FIG. 6, it can be seen that the shift lever 14 engages the center shift bar 29 for selecting among three positions in the direction of the arrow 34 (FIG. 1) thereby selecting an associated one of neutral and two gear ratios. The shift lever 14 can also be pivoted in the direction of an arrow 69 such that the tang portion 31 engages the forward notch 56 in the connector bar 54 in one direction and in the connector bar 55 in the other direction. If, for example, the tang 31 is shifted in the direction of an arrow 70 into the notch 56 in the bar 54, the interlock bracket 46 will also be moved such that the arm 57 associated with the connector bar 55 is moved into engagement with the forward notch 32 of the center shift bar 29. Thus, as the shift lever 14 is pivoted in the direction of the arrow 33, shown in FIG. 1, the connector bar 54 and the associated left shift bar 28 will be moved to one of three shift positions thereby selecting neutral or one of two different gear ratios in the transmission. At the same time, the bracket 46 will have engaged the notch 32 and the notch 56 in the connector bar 55 to prevent movement of the center shift bar 29 and the right shift bar 30. In a similar manner, if the tang 31 of the shift lever 14 is moved into engagement with the notch 56 formed in the connector bar 55, the arm 57 associated with the notch 56 in the connector bar 54 will move in the direction of an arrow 71 into engagement with the notch 32 formed in the center shift bar 29. The shift lever 14 can then be pivoted in the direction of the arrow 33 (FIG. 1) to select neutral or one of two more different gear ratios while the interlock bracket 46 prevents movement of the left shift bar 28 and the center shift bar 29.

Figures 2, 3:
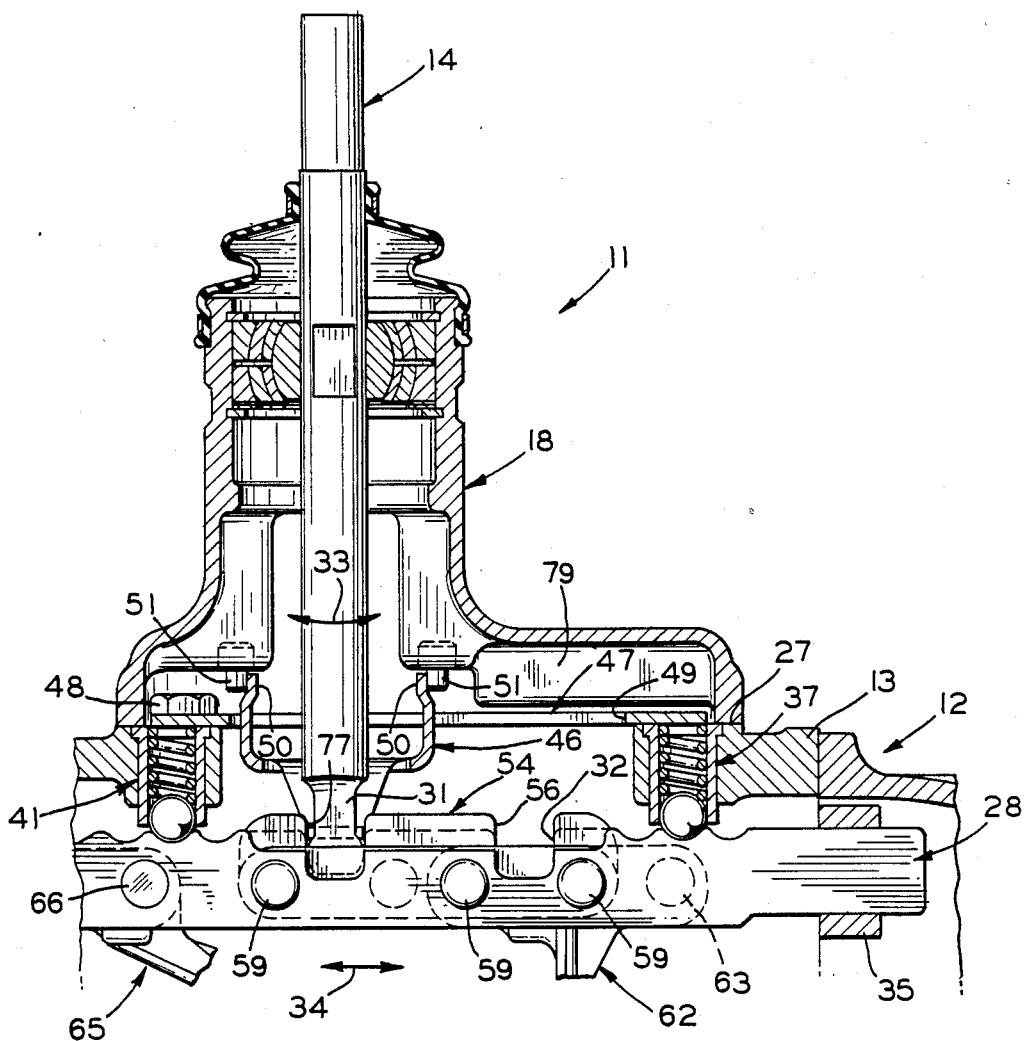
FIG. 2 is a view similar to FIG. 1 with the shift lever and shift tower assembly in a forward control position.
FIG. 3 is a top plan view of the present invention as shown in FIG. 1.

The shift lever and tower assembly 11 have been shown and described in a center control position in connection with FIGS. 1 and 3. As best shown in FIG. 3, the tower housing 18 is attached to the outer housing 13 of the vehicle transmission by a plurality of threaded fasteners. For example, four bolts 72 are positioned at four corners of the tower housing 18. In addition, a pair of bolts 73 are positioned on opposite sides of the longitudinal axis of the tower housing 18. The bolts 72 engage corresponding threaded apertures 74 and the bolts 73 engage corresponding threaded apertures 75 formed in the boss 27 as best shown in FIG. 4. The placement of the fastening means for the shift tower 18 is symmetrical with respect to a center point in the shift tower 18 such that the shift lever and tower assembly 11 can be rotated one hundred eighty degrees to the position shown in FIG. 2 which is known as a forward control position. The interlock bracket 46 has been moved to the opposite end of the aperture 49 formed in the mounting plate 47. The T-shaped arms 50 engage the guide pins 51 in the tower housing 18 in a generally vertically extending position of the shift lever 14, and the tang portion 31 engages a center notch 76 (FIG. 7) formed in the center shift bar 29. The arms 57 of the interlock bracket 46 engage a pair of forward notches 77 formed in the connector bars 54 and 55. The shift lever 14 and the bracket 46 cooperate in the same manner as was described with respect to the center control position to shift one of the three shift bars 28, 29 and 30 while the other two non-selected shift bars are held in place by the bracket 46. Thus, the shift pattern and the gear ratio changes are the same whether the shift lever and tower assembly is in the center control position shown in FIG. 1 or the forward control position shown in FIG. 2. The forward and center positions generally lie along a longitudinal axis of the shift tower and are equally spaced from the center of the mounting bolt pattern.

Not only does the interlock bracket 46 assist during the changing of the gear ratios in the vehicle transmission 12, but the design of the mounting plate 47 functions to retain the interlock bracket 46 during shipment of the transmission 12. Typically, the transmission 12 is shipped from the transmission manufacturer to the vehicle manufacturer without the shift lever 14 and the tower housing 18 assembled. Before the mounting plate 47 is attached to the boss 27 by the bolts 48, the upper end of left (as viewed in FIG. 4) side T-shaped arm 50 is inserted from below through a pair of assembly notches 78 formed on opposite sides of the elongated aperture 49. The bracket 47 is then moved towards the left until the other one of the T-shaped arms 50 can be inserted from below through the assembly notches 78. The interlock bracket 46 can be moved into either the center control position shown in FIG. 4 or the forward control position shown in FIG. 2 after the mounting plate 47 is attached to the transmission outer housing 13.

The interlock bracket 46 is now retained by the mounting plate 47 and cannot be removed from the assembly without removing the mounting plate 47. Thus, the transmission can be shipped without the tower housing 18. When the tower housing 18 is installed, the four guide pins 51 engage the T-shaped arms 50 to precisely locate the bracket 46. If the bracket is in the wrong position with reference to the housing 18, the internal ribs, such as a rib 79 shown in FIGS. 2 and 3, and the pins 51 will interfere with one of the arms 50 and prevent assembly. This forces the bracket 46 to be placed in the proper position for assembly.

The present invention has been illustrated and described in what is considered to represent its preferred embodiment. However, it should be noted that the invention may be practiced otherwise than as specifically illustrated and described without departing from the spirit and the scope of the attached claims.

What is claimed is:

1. A shifting apparatus for a vehicle transmission, the transmission having an outer housing enclosing at least one shift bar, a shift lever having one end extending through an aperture in the outer housing, and a shift tower mounted in the housing over the aperture for movably retaining the shift lever, comprising:

mounting means for positioning a shift tower and a shift lever in a first position and a second position with respect to an aperture in a transmission outer housing; and a pair of notches formed in a shift bar, a first one of said notches engaging one end of the shift lever in said first position and the other one of said notches engaging the one end of the shift lever in said second position, whereby actuation of the shift lever in said first and second positions changes the drive ratio of the transmission.

2. The shifting apparatus according to claim 1 wherein said mounting means includes a plurality of apertures formed in the shift tower in a symmetrical pattern, a plurality of threaded apertures formed in the transmission outer housing in said pattern, and a plurality of fasteners extending through said apertures in the shift tower and threadably engaging said threaded apertures.

3. The shifting apparatus according to claim 1 wherein said first and second positions lie along a longitudinal axis of the shift tower.

4. The shifting apparatus according to claim 1 wherein said first and second positions are spaced equally from a center point of said pattern.

5. The shifting apparatus according to claim 1 wherein the shift bar is a first shift bar and said mounting means includes a mounting plate attached to the transmission outer housing over the aperture and having an elongated aperture formed therein through which the one end of the shift lever extends, an interlock bracket resting on an upwardly facing surface of said mounting plate and extending downwardly through said elongated aperture, and at least one arm attached to said interlock bracket and extending into a notch formed in a second shift bar for preventing movement of said second shift bar as the shift lever moves said first shift bar.

6. The shifting apparatus according to claim 5 wherein the shift lever is movable in a first plane parallel to a longitudinal axis of the shift tower for moving said first shift bar and changing the drive ratio of the transmission and is movable in a second plane orthoganal to said first plane for disengaging said pair of notches in said first shift bar and for engaging a pair of notches formed in said second shift bar.

7. The shifting apparatus according to claim 6 wherein the shift lever is movable in a third plane for moving said second shift bar and changing the drive ratio of the transmission.

8. The shifting apparatus according to claim 1 wherein the shift lever is movable in a first plane generally parallel to a longitudinal axis of the shift tower for selecting among at least two different drive ratios in both said first position and said second position.

9. A shifting apparatus for a vehicle transmission, comprising:
a shift lever having an upper end and a lower end, said lower and extending through an aperture formed in an outer housing of a transmission;
a shift tower for movably retaining said shift lever, said upper end of said shift lever extending outwardly from said shift tower and being manually actuatable;
a shift bar positioned inside the transmission housing and having a pair of notches formed therein; and
means for mounting said shift tower on the outer housing over the aperture in a first forward control position for engaging said lower end of said shift lever with one of said pair of notches and in a second center control position for engaging said lower end of said shift lever with the other one of said pair of notches whereby movement of said shift lever moves said shift bar and changes the drive ratio of the transmission.

10. The shift apparatus according the claim 9 wherein said shift bar is a first shift bar and including at least a second shift bar having a pair of notches formed therein for engaging said lower end of said shift lever whereby movement of said shift lever in a plane parallel to and associated with a longitudinal axis of the shift bars moves the one of the said shift bars engaged by said lower end to change the drive ratio and movement of said shift lever in a plane perpendicular to the longitudinal axis of said shift bars selects the one of said shift bars to be engaged by said shift lever.

11. A shifting apparatus for a vehicle transmission having an outer housing enclosing at least a pair of shift bars for changing gear ratios, a shift lever having a lower end extending through an aperture in the outer housing, and a shift tower removably mounted on the housing over the aperture for movably retaining the shift lever in engagement with the shift bars, comprising:
mounting means for positioning a shift lever and a shift tower in a forward control position and a center control position with respect to an aperture in a transmission housing;
an interlock bracket for selectively engaging at least two shift bars in the transmission housing;
a forward notch and a center notch formed in each of the shift bars for selectively engaging a lower end of the shift lever and the interlock bracket; and
a mounting plate for retaining said interlock bracket in the transmission housing aperture prior to installation of the shift lever and the shift tower.

12. The shifting apparatus according to claim 11 wherein said mounting means includes a plurality of apertures formed in the shift tower, a plurality of threaded apertures formed about the transmission housing aperture, and a plurality of threaded fasteners extending through said shift tower apertures into threaded engagement with said threaded apertures.

13. The shifting apparatus according to claim 11 wherein said interlock bracket includes a pair of generally T-shaped arms adapted to rest on an upper surface of said mounting plate and a pair of generally C-shaped arms for engaging said forward and center notches.

14. The shifting apparatus according to claim 13 wherein said interlock bracket has an aperture formed therein through which the lower end of the shift lever extends whereby when the lower end of the shift lever engages one of said notches in one of the shift bars, one of said C-shaped arms engages a corresponding one of said notches in another one of the shift bars.

15. The shifting apparatus according to claim 11 including a connector bar attached to at least one of the shift bars, said connector bar having said forward notch and said center notch formed therein.

* * * * *